US012644006B2

(12) United States Patent
Goethals et al.

(10) Patent No.: US 12,644,006 B2
(45) Date of Patent: Jun. 2, 2026

(54) AQUEOUS RESIN PARTICLE DISPERSION

(71) Applicant: AGFA NV, Mortsel (BE)

(72) Inventors: Fabienne Goethals, Mortsel (BE); Freya Curinckx, Mortsel (BE)

(73) Assignee: Agfa NV, Mortsel (BE)

(*) Notice: Subject to any disclaimer, the term of this patent is extended or adjusted under 35 U.S.C. 154(b) by 768 days.

(21) Appl. No.: 17/920,439

(22) PCT Filed: Apr. 13, 2021

(86) PCT No.: PCT/EP2021/059477
§ 371 (c)(1),
(2) Date: Oct. 21, 2022

(87) PCT Pub. No.: WO2021/213833
PCT Pub. Date: Oct. 28, 2021

(65) Prior Publication Data

US 2023/0174807 A1 Jun. 8, 2023

(30) Foreign Application Priority Data

Apr. 22, 2020 (EP) ..................................... 20170757

(51) Int. Cl.
*C09D 11/38* (2014.01)
*B41M 7/00* (2006.01)

(52) U.S. Cl.
CPC ............. *C09D 11/38* (2013.01); *B41M 7/009* (2013.01)

(58) Field of Classification Search
CPC ....... C09D 11/38; C09D 11/322; C09D 11/40; C09D 11/104; C09D 11/102; C09D 11/54; C09D 177/06; B41M 7/009
USPC .......................................................... 523/210
See application file for complete search history.

(56) References Cited

U.S. PATENT DOCUMENTS

| | | | | |
|---|---|---|---|---|
| 2004/0076774 | A1* | 4/2004 | Loccufier | B41M 5/5227 428/32.1 |
| 2012/0016217 | A1 | 1/2012 | Srivastava et al. | |
| 2012/0071593 | A1* | 3/2012 | Andre | C09D 11/101 524/502 |
| 2012/0288487 | A1 | 11/2012 | Lee et al. | |

FOREIGN PATENT DOCUMENTS

| | | | |
|---|---|---|---|
| CN | 106008963 | A | 10/2016 |
| JP | 2020-002257 | A | 1/2020 |
| WO | WO 2015/158649 | A1 | 10/2015 |
| WO | WO 2016/122569 | A1 | 8/2016 |
| WO | WO 2016/165956 | A1 | 10/2016 |
| WO | WO 2018/077624 | A1 | 5/2018 |
| WO | WO 2018/138069 | A1 | 8/2018 |
| WO | WO 2020/064656 | A1 | 4/2020 |

OTHER PUBLICATIONS

European Patent Office, International Search Report in International Patent Application No. PCT/EP2021/059477, mailed Jun. 28, 2021, 5 pp.
European Patent Office, Written Opinion in International Patent Application No. PCT/EP2021/059477, mailed Jun. 28, 2021, 5 pp.
Kim et al., "Polyoxalate Nanoparticles as a Biodegradable and Biocompatible Drug Delivery Vehicle," *Biomacromolecules*, 11: 555-560 (2010).

* cited by examiner

*Primary Examiner* — Hannah J Pak
(74) *Attorney, Agent, or Firm* — Leydig, Voit & Mayer, Ltd.

(57) ABSTRACT

An aqueous resin particle dispersion, the resin comprises a repeating unit according to general formula (I). The resin particles can be incorporated in aqueous printing liquids such as aqueous inkjet inks.

(I)

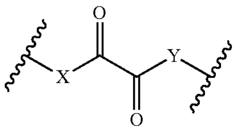

20 Claims, No Drawings

AQUEOUS RESIN PARTICLE DISPERSION

CROSS-REFERENCE TO RELATED APPLICATIONS

This patent application is the U.S. national phase of copending International Patent Application No. PCT/EP2021/059477, filed Apr. 13, 2021, which claims the benefit of European Patent Application No. 20170757.7, filed Apr. 22, 2020.

TECHNICAL FIELD

The present invention relates to aqueous dispersions of resin particles for use in printing and more specifically in inkjet printing with aqueous inkjet inks on non-absorbing substrates.

BACKGROUND ART

The industrial applications of ink jet are expanding into more and more fields of technology, having to meet ever more demanding physical properties. Industrial printing technology has to be compatible with cheap substrates, which are often poly(olefin) based. It is known in the industry that adhesion to poly(olefins) is often very difficult.

Until now, ink jet technology on non-absorbing substrates, including poly(olefins) has been UV based. UV-based inks contain toxic and/or harmful ingredients such as photo-initiators, monomers and the printing process requires a curing station which increases the price and complexity of the printing equipment. Therefore, aqueous ink technology is gradually gaining ground also on non-absorbing substrates. Adhesion of aqueous resin based inks directly on poly(olefins) remains even more difficult compared to UV technology.

Several approaches are known in the art to improve adhesion of aqueous inks, including corona treatment, flame treatment of the substrate and priming of the substrate with primers containing resins such as polyurethane resins. Pretreating the substrate with corona and flame treatment complicates the work flow and does not always solve the adhesion problem, especially on poly(olefins).

Aqueous based primers or aqueous based inkjet inks containing resins such as polyurethane resins have been designed to improve image durability such as scratch resistance, abrasion resistance and chemical resistance. WO2018077624A describes aqueous inkjet inks comprising a polyurethane resin having dispersing groups providing electronic and steric colloidal stabilisation. WO 2016/122569 teaches a primer solution comprising a polyurethane resin having a specific glycol. Aqueous inks and primers still suffer from insufficient adhesion to poly(olefin) substrates. Moreover, the use of resins dispersed or dissolved in an aqueous ink or primer which has to be jetted via e.g. an inkjet head, causes problems of jetting reliability. This may be due to film formation of the resin at the nozzle plate causing clogging of the nozzles when the inkjet head is not in use for some time.

In WO2016/165956 aqueous resin based inkjet inks are described wherein the resin is present as a capsule to improve the jetting reliability of resin based inks. However, to achieve good binding properties and hence durable images, reactive chemistry such as blocked isocyanates is incorporated in the core of the capsule. The presence of such reactants may give health and safety issues when not completely reacted.

Therefore, there is still a need for a resin technology that intrinsically shows a good adhesion performance to non-absorbing substrates such as PMMA, PVC and poly(olefins), and at the same time can be incorporated in aqueous inkjet inks or jettable primers providing reliable jetting performances.

SUMMARY OF INVENTION

It is the objective of the present invention to provide a solution to the above stated problem. The objective has been achieved by providing an aqueous dispersion of a resin particle as defined in claim 1.

It is further an object of the present invention to provide an inkjet ink comprising the resin particle dispersion of claim 1 as defined in claim 8.

It is another embodiment of the invention to provide a printing method using inkjet inks comprising the resin particle dispersion of claim 1 as defined in claim 10.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Aqueous Dispersion of Resin Particles

A.1. Resin

The invention comprises a resin particle dispersed in an aqueous medium, the resin comprises a repeating unit according to the General formula I.

General formula I

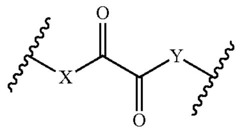

wherein

X is O, S, ONH, NR, NH—NHR

Y is independently O, S, NH, NR, NH—NHR. More preferably, the resin comprises a repeating unit according to the General formula II or III.

General formula II

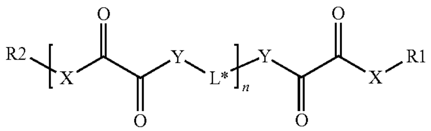

wherein

X and Y are independently O, S, NH, NR, NH—NH or NH—NR;

L* represents a divalent, trivalent, tetravalent, heptavalent or hexavalent linking group;

R1 and R2 independently represent any substituted or unsubstituted alkyl, aryl, aralkyl or heteroaryl group, or a terminal group;

n is an integer from 0 to 150.

General formula III

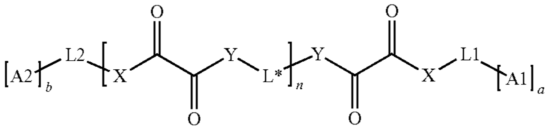

wherein

X and Y are independently O, S, NH, NR, or NH—NHR;

L* represents a divalent, trivalent, tetravalent, heptavalent or hexavalent linking group;

L1 and L2 are independently a monovalent, divalent or multi-valent linking group;

A1 and A2 independently represent any substituted or unsubstituted alkyl, aryl, aralkyl or heteroaryl group, or a terminal group;

a represents 1, 2, 3, 4 or 5 respectively for a mono-, di-, tri-, tetra-, heptavalent Linking group L1 b represents 1, 2, 3, 4 or 5 respectively for a mono-, di-, tri-, tetra-, heptavalent Linking group L2 n is an integer from 0 to 150.

The resin comprising a repeating unit according to general formula I may be an oligomer, a pre-polymer or a polymer and is obtainable by reacting an oxalate ester or an oxalyl chloride with an amine or a hydrazide.

A.1.1. Oxalate Esters and Oxalyl Chlorides

Oxalate esters are typically prepared by condensation reaction of oxalic acid or oxalyl halides with alcohols, or by a substitution reaction of oxalic acid with an alkyl halide.

Symmetrical oxalates can be used in the preparation of the resin of the current invention for reaction with an amine, a hydrazide, preferably a multi-functional amine, for example the reaction between dimethyl oxalate and 1,4-butanediamine. In a 1:1 molar ratio of oxalate ester versus amine, a condensation reaction would occur, resulting in the formation of a polymer. Preferably, the amount of oxalate moieties is kept twice the amount of amine moieties, so that the molecular weight of the obtained resin is low and can be kept under control. The molecular weight of the resin of the invention is preferably not more than 15000 g/mol, more preferably not more than 5000 g/mol. A low molecular weight has the advantage of a higher solubility in the solvent used for the encapsulation and hence an improved processability.

In another preferred embodiment of the invention, the resin can be prepared by reacting an oxalyl chloride with an amine, preferably a multi-functional amine.

Preferred oxalate esters for use in the preparation of the resin of the invention are dimethyl oxalate, diethyl oxalate, and dibutyl oxalate. Most preferred are diethyl and dibutyl oxalate. Diethyl oxalate is more reactive and the released ethanol can be removed easily under reduced pressure. Dibutyl oxalate is less reactive and has a better solubility, resulting in a better control over the reaction.

Typical oxalate esters for the preparation of resin according to the present invention are given in Table 1 without being limited thereto.

TABLE 1

| | | |
|---|---|---|
| 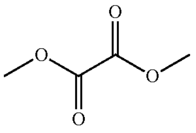 | Dimethyl oxalate | OE-1 |

TABLE 1-continued

| | | |
|---|---|---|
| 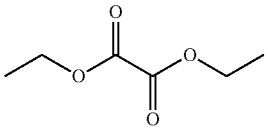 | Diethyl oxalate | OE-2 |
| 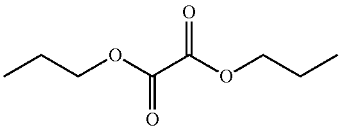 | Dipropyl oxalate | OE-3 |
| 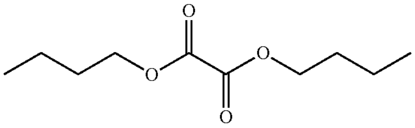 | Dibutyl oxalate | OE-4 |
| 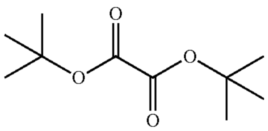 | Di-t-butyl oxalate | OE-5 |
| 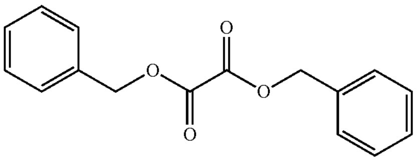 [SMILES: O=C(OCc1ccccc1)C(=O)OCc1ccccc1] | Dibenzyl oxalate | OE-6 |
| 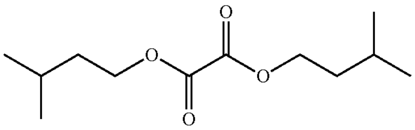 [SMILES: CC(C)CCOC(=O)C(=O)OCCC(C)C] | Diisopentyl oxalate | OE-7 |

It is also possible to use asymmetrical oxalate esters in the preparation of the resin of the invention. The use of asymmetrical oxalate esters may have a beneficial impact on solubility of the obtained resin, resulting in a higher solubility due to lower crystallization. However, the commercial availability is low. General reaction routes to prepare asymmetrical oxalate esters, is by starting from an asymmetrical oxalyl chloride, such as ethyl oxalyl chloride.

A short, non-extensive list of asymmetrical oxalates is given in Table 2. It should be clear that a large library of molecules is possible by the combination of an alkyl oxalyl chloride and an alcohol.

TABLE 2

| | | |
|---|---|---|
| 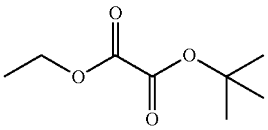 | Tert-butyl ethyl oxalate | OE-8 |
| 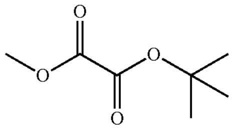 | Tert-butyl methyl oxalate | OE-9 |

TABLE 2-continued

| | |
|---|---|
| 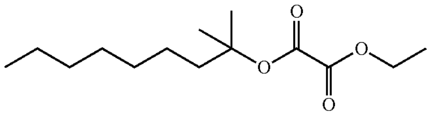 [SMILES: CCCCCCCC(C)(C)OC(=O)C(=O)OCC] | OE-10 |

The use of mixtures of the above proposed oxalate esters in the preparation of the resin are also possible in the present invention. Using mixtures of oxalate esters has a beneficial effect on the solubility of the resin, as crystallization is less likely to happen with mixtures of compounds.

A.1.2. Amines and Hydrazides

The amine used in the preparation of the resin of the present invention is preferably a multi-functional amine, although the invention is not limited thereto: also mono-functional amines can be used. The multi-functional amine will react with the oxalate ester or oxalyl halide to form a resin having the repeating unit according to general formula I.

A non-extensive list of possible amines to be used in the preparation of the resin having the repeating unit according to general formula I is given in Table 3.

TABLE 3

| | | |
|---|---|---|
| 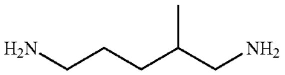 | 1,5-Diamino-2-methylpentane | AM-1 |
| 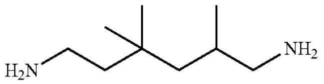 | 2,4,4-trimethylhexane-1,6-diamine | AM-2 |
| 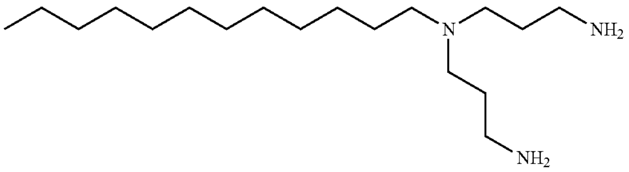 [SMILES: CCCCCCCCCCCCN(CCCN)CCCN] | N-(3-Aminopropyl)-N-dodecylpropane-1,3-diamine | AM-3 |
| 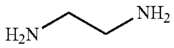 | 1,2-diaminoethane | AM-4 |
| 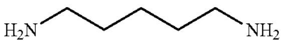 | 1,5-pentanediamine | AM-5 |
| 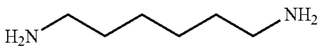 | 1,6-hexanediamine | AM-6 |
| 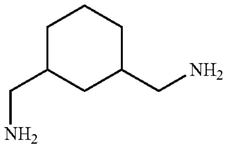 | 1,3-Cyclohexanebis (methylamine) | AM-7 |
| 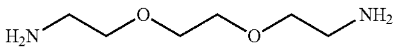 | 2,2'-(Ethylenedioxy) bis(ethylamine) | AM-8 |
| 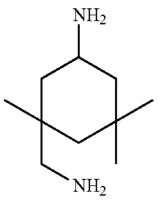 | 3-(aminomethyl)-3,5,5-trimethyl-cyclohexanamine | AM-9 |
| 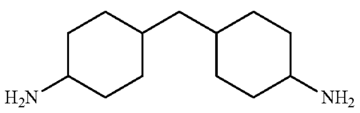 [SMILES: NC1CCC(CC2CCC(N)CC2)CC1] | 4,4'-methylene biscyclohexylamine | AM-10 |
| 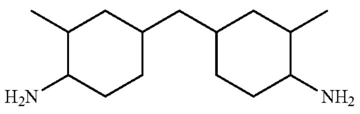 [SMILES: CC1CC(CC2CCC(N)C(C)C2)CCC1N] | Bis(3-methyl-4-aminocyclohexyl) methane | AM-11 |

TABLE 3-continued
| | | |
|---|---|---|
| 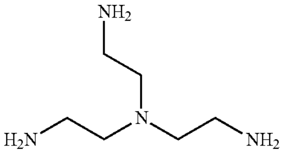 | N',N'-bis(2-aminoethyl)ethane-1,2-diamine | AM-12 |
| 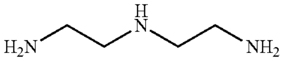 | diethyelenetriamine | AM-13 |
| 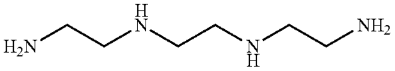 | triethylenetetramine | AM-14 |
| 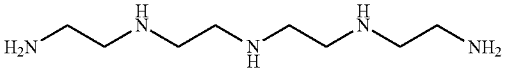 [SMILES: NCCNCCNCCNCCN] | Tetraethylenepentamine | AM-15 |
| 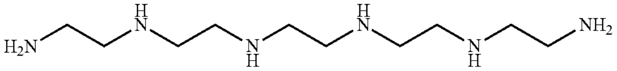 [SMILES: NCCNCCNCCNCCNCCN] | Pentaethylenehexamine | AM-16 |
| 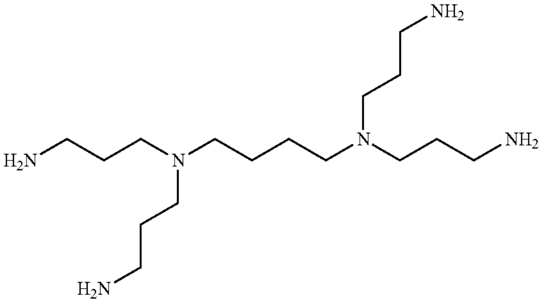 [SMILES: NCCCN(CCCN)CCCCN(CCCN)CCCN] | N,N,N',N'-Tetrakis(3-aminopropyl)-1,4-diaminobutane | AM-17 |
| 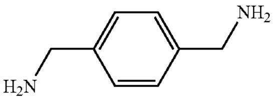 | p-xylylenediamine | AM-18 |
| 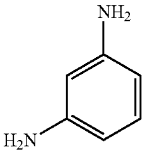 | m-phenyldiamine | AM-19 |
| 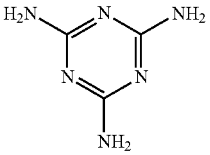 | melamine | AM-20 |

In another embodiment of the invention, the resin having a repeating unit according to the general formula I can be prepared by reacting an oxalate ester or oxalyl chloride with a hydrazide. This results in a resin with potential additional hydrogen bonding leading to improved properties such as mechanical resistance and scratch resistance.

A list of possible hydrazides is given in Table 4.

TABLE 4

| | |
|---|---|
| 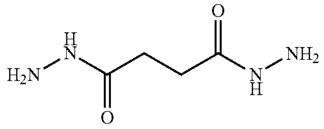 | HZ-1 |
| 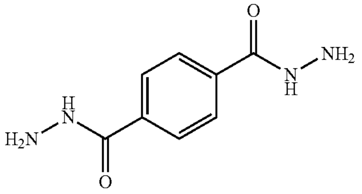 [SMILES: NNC(=O)c1ccc(C(=O)NN)cc1] | HZ-2 |
| 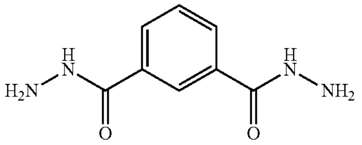 [SMILES: NNC(=O)c1cccc(C(=O)NN)c1] | HZ-3 |
| 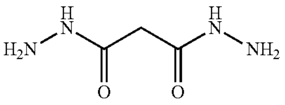 | HZ-4 |

A.2. Capsules Comprising the Resin

The resin comprising at least one repeating unit according to formula I can be encapsulated by an encapsulation process in which the resin is surrounded by a polymeric shell to give small capsules. The encapsulation process is preferably performed before the resin is dispersed into an aqueous medium.

The encapsulation technology has been applied in different technical fields, such as self-healing compositions (Blaiszik et al., Annual Review of Materials, 40, 179-211 (2010)), textile treatment (Marinkovic et al., CI&CEQ 12(1), 58-62 (2006); Nelson G., International Journal of Pharmaceutics, 242, 55-62 (2002), Teixeira et al., AIChE Journal, 58(6), 1939-1950 (2012)), thermal energy storage and release for buildings (Tyagi et al., Renewable and Sustainable Energy Reviews, 15, 1373-1391 (2011)), printing and recording technology (Microspheres, Microcapsules and Liposomes: Volume 1: Preparation and Chemical Applications, editor R. Arshady, 391-417 and ibid., 420-438, Citus Books, London, 1999), personal care, pharmaceuticals, nutrition, agrochemicals (Lidert Z., Delivery System Handbook for Personal Care and Cosmetic Products, 181-190, Meyer R. Rosen (ed.), William Andrew, Inc. 2005; Schrooyen et al., Proceedings of the Nutrition Society, 60, 475-479 (2001)) and electronic applications (Yoshizawa H., KONA, 22, 23-31 (2004)).

Microcapsules containing the resin comprising a repeating unit according to general formula I can be prepared using both chemical and physical methods. Encapsulation methodologies include complex coacervation, liposome formation, spray drying and precipitation and polymerization methods. For technological applications, interfacial polymerisation is a particularly preferred technology, which has been reviewed by Zhang Y. and Rochefort D. (Journal of Microencapsulation, 29(7), 636-649 (2012) and by Salaün F. (in Encapsulation Nanotechnologies, Vikas Mittal (ed.), chapter 5, 137-173 (Scrivener Publishing LLC (2013)).

In the present invention preferably a polymerization method is used, as it allows the highest control in designing the capsules. More preferably interfacial polymerization is used to prepare the capsules used in the invention. This technique is well-known and has been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerization is a particularly preferred technology for the preparation of capsules comprising the resin of the present invention. In interfacial polymerization, such as interfacial polycondensation, two reactants meet at the interface of the emulsion droplets and react rapidly.

In general, interfacial polymerization requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerization, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerization. The capsules according to the present invention are preferably prepared from an oleophilic dispersion in an aqueous continuous phase wherein the resin comprising a repeating unit according to the general formula I is dissolved or dispersed in the oleophilic phase.

Typical polymeric shells of the capsules according to the invention and formed by interfacial polymerization are selected from the group consisting of polyamides, typically prepared from di- or oligoamines as first shell component and di- or poly-acid chlorides as second shell component, polyurea, typically prepared from di- or oligoamines as first shell component and di- or oligoisocyanates as second shell component, polyurethanes, typically prepared from di- or oligoalcohols as first shell component and di- or oligoisocyanates as second shell component, polysulfonamides, typically prepared from di- or oligoamines as first shell component and di- or oligosulfochlorides as second shell component, polyesters, typically prepared from di- or oligoalcohols as first shell component and di- or oligo-acid chlorides as second shell component and polycarbonates, typically prepared from di- or oligoalcohols as first shell component and di- or oligo-chloroformates as second shell component. The shell can be composed of combinations of these polymers.

In a further embodiment, polymers, such as gelatine, chitosan, albumin and polyethylene imine can be used as first shell components in combination with a di- or oligoisocyanate, a di- or oligo acid chloride, a di- or oligochloroformate and an epoxy resin as second shell component.

In a particularly preferred embodiment, the shell is composed of a polyurethane, a polyureum or a combination thereof. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters, ketones and DCM are particularly preferred as water immiscible solvent.

It has to be mentioned that it is possible that unreacted amine functionalities which are incorporated in the polymeric shell of the capsule through reaction of the isocyanate shell starting compounds, may react with the oxalate ester moieties of the resin of the invention. This could lead to a better "intermixing" of the core and the shell of the microcapsule. A homogeneous overlap between the core comprising the resin having the repeating unit according to general formula I and the polymeric shell of the capsule may be responsible for the increased water and solvent resistance of the images and coatings comprising these capsules.

In the most preferred embodiment, the capsules comprising the resin comprising a repeating unit according to general formula I are self-dispersing capsules. Self-dispersing capsules have the advantage that no extra dispersant is required in the ink formulation. An extra dispersant can cause stability problems if pigments in the ink formulation are present which also contain a dispersant which is different from the dispersant of the capsule. In order to make capsules self-dispersing, non-ionic groups such as polyether chains, anionic dispersing groups, such as carboxylic acids or salts thereof, or cationic dispersing groups such as ammonium groups have to be coupled covalently to the polymeric shell of the capsule to guarantee the dispersion stability. A mixture of a non-ionic group with an anionic or cationic group is also possible.

A preferred strategy to incorporate anionic stabilizing groups into the polymeric shell of the encapsulated resin comprising a repeating unit according to general formula A, makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphonic acid or salt thereof can be used.

Another preferred strategy is to incorporate an anionic stabilizing group together with a non-ionic stabilising group into the shell polymer. The non-ionic stabilising group may be a polyether structure, preferably a group as disclosed in [0019-0020] of EP3564318A1. Such a non-ionic group can be incorporated by using isocyanates comprising a polyether group in the encapsulation process. Suitable isocyanates are: Bayhydur 3100, Bayhydur 304, Bayhydur 305, Bayhydur XP2451/1, Bayhydur 401-70, supplied by Covestro AG. When the shell has both an anionic and a non-ionic dispersing group, the dispersing effect of both groups synergistically provide marked improvement dispersion stability.

Another preferred strategy to incorporate cationic stabilizing groups into the polymeric shell of the encapsulated resin comprising a repeating unit according to the general formula I makes use of coupling a surfactant with a cationic dispersing group to the polymeric shell according to the present invention by reaction of a surfactant comprising at least one primary or secondary amine group and at least a group selected from protonated amine, a protonated nitrogen containing heteroaromatic compound, a quaternized tertiary amine, a N-quaternized heteroaromatic compound, a sulfonium and a phosphonium with an isocyanate monomer of the shell. In an even more preferred embodiment said surfactant is a surfactant according to General Formula IV General Formula IV

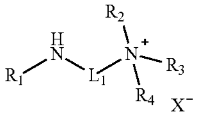

wherein $R_1$ is selected from the group consisting of a substituted or unsubstituted alkyl group, a substituted or unsubstituted alkenyl group and a substituted or unsubstituted alkynyl group with the proviso that $R_1$ comprises at least eight carbon atoms;

$R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubsituted alkaryl group and a substituted or unsubstituted (hetero)aryl group $L_1$ represents a divalent linking group comprising no more than eight carbon atoms;

X represents a counterion to compensate the positive charge of the ammonium group.

The capsules have an average particle size preferably of no more than 4 μm as determined by dynamic laser diffraction. The nozzle diameter of inkjet print heads is usually 20 to 35 μm. Reliable inkjet printing is possible if the average particle size of the capsules is five times smaller than the nozzle diameter. An average particle size of no more than 4 μm allows jetting of inks incorporating the dispersion of the invention by print heads having the smallest nozzle diameter of 20 μm. In a more preferred embodiment, the average particle size of the capsules is ten times smaller than the nozzle diameter. Hence preferably, the average particle size is from 0.05 to 2 μm, more preferably from 0.10 to 1 μm. When the average particle size of the capsule is smaller than 2 μm, excellent resolution and dispersion stability with time are obtained.

The capsules according to the invention are dispersed into an aqueous medium. The aqueous medium consists of water, but may preferably include one or more water-soluble organic solvents. It has been observed that the presence of water-soluble organic solvent in the inkjet ink or pretreatment liquid further enhances the solvent and water resistance of the obtained coatings and images.

Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

B. Aqueous Formulations Comprising the Dispersion of the Invention.

B.1. Pre-Treatment Liquid

Aqueous pre-treatment liquids are preferably used in inkjet printing with aqueous based inks onto non-absorbing substrates. The aqueous pre-treatment liquid according to the invention comprises the dispersion of resin particles, the resin comprising a repeating unit according to the general formula I. More preferably, the resin particle is encapsulated by a polymeric shell. The polymeric shell further comprises a dispersing group, preferably covalently bonded to the shell, more preferably, the dispersing group is a group selected from the group of a protonated amine, a protonated nitrogen containing heteroaromatic compound, a quaternized tertiary amine, a N-quaternized heteroaromatic compound, a sulfonium and a phosphonium. The cationic dispersing groups will help in flocculating or crashing the anionic stabilized colorants on the aqueous inkjet ink leading to a reduced bleeding and beading in the formed image.

The aqueous pre-treatment liquid contains water, but may include one or more water-soluble organic solvents. Suitable organic solvents are described in § A.2. The capsules are preferably in an amount of no more than 45 wt. %, more preferably between 5 and 25 wt. % based on the total weight of the pre-treatment liquid.

A multivalent metal ion can be contained in the pre-treatment liquid as a flocculant. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating ink by acting on the carboxyl groups on the surface of the pigment in the ink jet ink, or on the dispersed polymer of capsules contained in the ink. As a result, the colorants of the ink are fixed resulting in a decreased bleeding and beading. Therefore, it is preferred that the surface of the pigment in the ink and/or the dispersed polymer of the capsules, if contained in the ink, have an anionic group, preferably a carboxyl group.

The pre-treatment may also contain organic acids as a flocculant. Preferred examples of the organic acids include, but are not limited to, acetic acid, propionic acid, and lactic acid.

The pre-treatment liquid may also further contain a resin as a flocculant. Examples of the resin include, but are not limited to, starches; cellulosic materials such as carboxymethyl cellulose and hydroxymethyl cellulose; polyurethanes, polysaccharide; proteins such as gelatine and casein; water-soluble naturally occurring polymers such as tannin and lignin; and synthetic water-soluble polymers such as polymers comprising polyvinyl alcohol, polymers comprising polyethylene oxide, polymers formed from acrylic acid monomers, and polymers formed from maleic anhydride monomers. Other suitable resins are acrylic polymers as described in EP2362014 [0027-0030]. Preferably the resin is a cationic resin, more preferably a cationic charged polyurethane. The resin content is preferably not more than 20 wt. % relative to the total mass of the pre-treatment liquid (100 mass %).

The pre-treatment liquid may also contain humectants. Humectants are preferably incorporated in the pre-treatment liquid if this liquid has to be applied by means of a jetting technique such as inkjet or valve jet. Humectants prevent the clogging of nozzles. The prevention is due to its ability to slow down the evaporation rate of the pre-treatment liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

The pre-treatment liquid may contain a surfactant. Any known surfactant may be used but preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2,4,7,9-tetramethyl-5-decine-4,7-diol, alkylene oxide adducts of 2,4,7,9-tetramethyl-5-decine-4,7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1 010, or from Nissin Chemical Industry as Surfynol (registered trademark) 465 and Surfynol 61.

The pre-treatment liquid may also contain pigments. Particularly useful for printing on dark or transparent substrates, is a pre-treatment liquid containing a white pigment. The preferred pigment for the aqueous pre-treatment liquid ink is titanium dioxide. Titanium dioxide ($TiO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the pre-treatment liquid. For applications demanding high hiding or decorative printing applications, the titanium dioxide particles preferably have an average size of less than about I μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TIO_2$.

The titanium dioxide is preferably incorporated into the pre-treatment formulation via a slurry concentrate composition. The amount of titanium dioxide present in the slurry composition is preferably from about 15 wt. % to about 80 wt. %, based on the total slurry weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photo-reactivity of the titanium dioxide. Metal oxide coatings of alumina, aluminasilica, boria and zirconia result in a positive charged surface of the $TiO_2$ pigments and hence are particularly useful in combination with the cationic stabilised capsules of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

The pre-treatment liquid may contain at least one pH adjuster. Suitable pH adjusters include organic amines, NaOH, KOH, $NEt_3$, $NH_3$, HCl, $HNO_3$ and $H_2SO_4$. In a preferred embodiment, the pre-treatment liquid has a pH lower than 7. A pH of 7 or less can advantageously influence the electrostatic stabilization of the capsules, especially when the dispersing groups of the capsules are amines.

B.2. Aqueous Inkjet Ink.

The aqueous inkjet ink according to the present invention includes at least a) an aqueous medium; and b) a dispersion of resin particles, the resin comprising a repeating unit according to the general formula I; and c) a colorant such as a dye or a pigment. Preferably the resin particle is encapsulated by means of a polymeric shell. The polymeric shell may further comprise a dispersing group, preferably covalently bonded to the shell, more preferably, the dispersing group is a group selected from the group consisting of a carboxylic acid or salt thereof, a sulfonic acid or salt thereof, a phosphoric acid ester or salt thereof, a phosphonic acid or salt thereof. A combination of both an anionic and a non-ionic dispersing group linked to the polymeric shell can also be used to stabilise the capsule in an inkjet ink.

The resin particles according to the invention are preferably present in the inkjet ink in an amount of no more than 30 wt. %, preferably between 5 and 25 wt. % based on the total weight of the inkjet ink. It was observed that above 30 wt. % jetting was not always so reliable.

In a preferred embodiment, the inkjet ink according to the invention is part of an inkjet ink set, more preferably part of a multi-colour inkjet ink set including a plurality of inkjet inks according to the invention. The inkjet ink set preferably includes at least a cyan inkjet ink, a magenta inkjet ink, a yellow inkjet ink and a black inkjet ink. Such a CMYK-inkjet ink set may also be extended with extra inks such as red, green, blue, violet and/or orange to further enlarge the colour gamut of the image. The inkjet ink set may also be extended by the combination of the full density inkjet inks with light density inkjet inks. The combination of dark and light colour inks and/or black and grey inks improves the image quality by a lowered graininess.

In a preferred embodiment, the inkjet ink set also includes a white inkjet ink. This allows obtaining more brilliant colours, especially on transparent substrates, where the white inkjet ink can be applied either as a primer or on top of the colour inkjet inks when the image is viewed through the transparent substrate.

The viscosity of the inkjet ink is preferably smaller than 25 mPa·s at 25° C. and at a shear rate of 90 $s^{-1}$, more preferably between 2 and 15 mPa·s at 25° C. and at a shear rate of 90 $s^{-1}$.

The surface tension of the inkjet ink is preferably in the range of about 18 mN/m to about 70 mN/m at 25° C., more preferably in the range of about 20 mN/m to about 40 mN/m at 25° C.

The inkjet ink may also contain at least one surfactant for obtaining good spreading characteristics on a substrate.

B.2.1. Solvent

The aqueous medium of the ink contains water, but may preferably include one or more water-soluble organic solvents. Suitable solvents which can be incorporated in the inks are described in § A.2.

B.2.2. Pigments

The pigments of the aqueous inkjet ink may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548.

The pigment particles are dispersed in an aqueous medium by means of a polymeric dispersant or a surfactant. Self-dispersible pigments may also be used. If combined with capsules having anionic dispersing groups, anionic surfactants may be preferably used as dispersant for the pigment. A self-dispersible pigment is a pigment having on its surface covalently bonded anionic hydrophilic groups, such as salt-forming groups or the same groups used as dispersing groups for the capsules comprising the resin comprising a repeating unit according to general formula I, that allow the pigment to be dispersed in an aqueous medium without using a surfactant or a resin. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer BI90plus based upon the principle of dynamic light scattering. The ink is diluted with water to a pigment concentration of 0.002 wt %. The measurement settings of the BI90plus are: 5 runs at 23° C., angle of 90°, wavelength of 635 nm and graphics=correction function.

However, for white pigment inkjet inks, the numeric average particle diameter of the white pigment is the same as described in § B.1.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from Lubrisol. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

B.2.3. Resin

The ink jet ink composition according to the invention may further comprise a resin. The resin is often added to the ink jet ink formulation to further achieve a good adhesion of the pigment to the substrate. The resin is a polymer and suitable resins can be acrylic based resins, a urethane-modified polyester resin or a polyethylene wax.

The polyurethane resin may be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin which may be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the unpublished patent application EP16196224.6.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim CA); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the ink jet ink according to the invention is at least 1 (wt.)% and preferably lower than 30 (wt.)%, more preferably lower than 20 (wt.)%.

B.2.4. Additives

The aqueous inkjet ink according to the invention may further comprise a surfactant, a humectant and a thickener as an additive. These suitable additives are described in § B.1.

C. Inkjet Printing Method

In a preferred inkjet recording method, the method comprises the steps of: a) jetting an aqueous inkjet ink on a substrate, preferably a non-porous substrate, the ink comprising the dispersion of resin particles, the resin comprising a repeating unit according to the general formula I; and b) drying the jetted inkjet ink by applying heat such as to obtain a temperature of the jetted ink of at least 80° C., more preferably at least 100° C. Before the jetting of the inkjet ink according to the invention, an aqueous pre-treatment liquid or primer can be applied onto the substrate. The aqueous pre-treatment liquid comprises preferably a flocculant selected from the group consisting of a multivalent salt and a cationic resin.

In another preferred inkjet recording method, the method comprises the steps of: a) applying an aqueous pre-treatment liquid on a substrate, preferably a non-porous substrate, the pre-treatment liquid comprising the dispersion of resin particles, the resin comprising a repeating unit according to the general formula I; b) optionally at least partially dry the applied aqueous pre-treatment liquid such as to obtain a temperature of the applied pre-treatment liquid of at least 80° C., more preferably at least 100° C.; and c) jetting an aqueous inkjet ink onto the applied pre-treatment liquid, the ink comprising a colorant preferably a pigment and more preferably also comprising the dispersion of resin particles, the resin comprising a repeating unit according to the general formula I; and d) drying the jetted inkjet. If step b) was not performed, or the drying of the pre-treatment liquid was not completed, the drying in step d) should be performed by applying heat such that the temperature of the jetted ink is of at least 80° C., more preferably at least 100° C.

The substrate in the inkjet recording method may be porous, such as e.g. textile, paper, leather and card board substrates, but is preferably a non-absorbing substrate such as polyethylene, polypropylene, polycarbonate, polyvinyl chloride, polyesters like polyethylene terephthalate (PET), polyethylene naphthalate (PEN), polylactide (PLA), polymethylmethacrylate or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

In another preferred inkjet recording method, the pre-treatment liquid is applied via a technique selected from the group of ink jetting, valve jetting and spraying. More specifically, these techniques of ink jetting and valve jetting allow, the pre-treatment liquid according to the invention to be applied image wise, preferably onto the surfaces whereupon the inkjet ink will be printed to obtain an image. These last means of applying the pre-treatment liquid has the advantage that the amount of required pre-treatment liquid is substantially lower than with other application methods of priming the substrate.

Examples of the heating process to dry the pre-treatment liquid or the inkjet ink according to the invention include, but are not limited to, heat press, atmospheric steaming, high-pressure steaming, THERMOFIX. Any heat source can be used for the heating process; for example, an infrared ray source is employed.

The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step is such that a temperature is preferably obtained below 150° C.

A preferred ink jet head for the inkjet printing system to jet the inkjet ink or pre-treatment liquid comprising the resin particles according to the invention is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the aqueous inkjet ink or aqueous pre-treatment liquid comprising the resin particles according to the present invention is not restricted to piezoelectric inkjet printing. Other inkjet print heads can be used and include various types, such as a continuous type, a thermal print head type, a MEM-jet type head and a valve jet type.

EXAMPLES

1. Materials

All materials used in the following examples were readily available from standard sources such as Merck and ACROS (Belgium) unless otherwise specified. The water used was deionized water.

Lakeland ACP70 is a 70-75 wt. % solution of CASRN84812-94-2 from Espachem.

Desmodur N75 BA is a trifunctional isocyanate supplied by Bayer AG.

Trixene B17963 is a 70% solution from Baxenden Chemicals

Takenate D131N is an XDI isocyanurate, manufactured by Mitsui Chemicals.

Sub-1 is poly(propylene) (Priplak), supplied by Antalis

Dowanol DPM is a mixture of dipropyleneglycol monomethyl ethers from Dow Chemical Diamond D75M is a 15 wt. % dispersion of pigment red 122 in water, available from Diamond Dispersion.

Oxalate prepolymer is prepared as follows:

2 g of tris(2-aminoethyl)amine is dissolved in 20 mL dichloromethane at room temperature. 8,312 g of dibutyl oxalate is added drop-wise. The reaction is slightly exothermic. A clear solution is obtained, which is used as such in the capsule preparation.

PROXEL K is a 5 w % solution of CASRN127553-58-6 in water.

Preparation of Inventive Resin Particle Dispersion INVDISP-1

In a first vessel, 7 g of Oxalate prepolymer was added to 20 g of dichloromethane. 20 g of Takenate D131N was then added under stirring, resulting in a clear solution. 1.32 g of Lakeland ACP70 was added to this mixture. In a separate vessel, 3.86 g of Lakeland ACP70, 0.236 g of a 28% ammonia solution and 2 g of L-lysine were added to 70 g of water and stirred until everything was dissolved. The first vessel was then added to the second vessel while stirring during 5 min, using a T25 digital Ultra-Turrax® with an 18N rotor commercially available from IKA at 15000 rpm. A white emulsion was thus obtained. The organic solvent and ammonia were then removed under reduced pressure, as well as 13.5 g of water. The same amount of water was then added again to the dispersion after which it was left to react further at 21° C. during 16 hours.

Preparation of Comparative Resin Particle Dispersion Containing a Blocked Isocyanate COMPDISP-1 in the Core In a first vessel, 10 g of Trixene 817963 (blocked isocyanate) was added to 20 g of dichloromethane. 20 g of Takenate D131N was then added under stirring, resulting in a clear solution. 1.32 g of Lakeland ACP70 was added to this mixture. In a separate vessel, 3.86 g of Lakeland ACP70, 0.236 g of a 28% ammonia solution and 2 g of L-lysine were added to 70 g of water and stirred until everything was dissolved. The first vessel was then added to the second vessel while stirring during 5 min, using a T25 digital Ultra-Turrax® with an 18N rotor commercially available from IKA at 15000 rpm. A white emulsion was thus obtained. The organic solvent and ammonia were then removed under reduced pressure, as well as 14.8 g of water. The same amount of water was then added again to the dispersion after which it was left to react further at 21° C. during 16 hours.

Preparation of Comparative Capsule Dispersion without Reactive Chemistry in the Core COMPDISP-2

In a first vessel, 20 g of Takenate D131N was added to 20 g of dichloromethane. 1.32 g of Lakeland ACP70 was added to this mixture. In a separate vessel, 3.86 g of Lakeland ACP70, 0.236 g of a 28% ammonia solution and 2 g of L-lysine were added to 70 g of water and stirred until everything was dissolved. The first vessel was then added to the second vessel while stirring during 5 min, using a T25 digital Ultra-Turrax® with an 18N rotor commercially available from IKA at 15000 rpm. A white emulsion was thus obtained. The organic solvent and ammonia were then removed under reduced pressure, as well as 11.9 g of water. The same amount of water was then added again to the dispersion after which it was left to react further at 21° C. during 16 hours.

Preparation of aqueous inks comprising inventive and comparative capsule dispersions.

Inventive and comparative aqueous inkjet inks were prepared by mixing the ingredients as listed in Table 5.

TABLE 5

| Amount in g added | INVINK-1 | COMPINK-1 | COMPINK-2 |
|---|---|---|---|
| INVDISP-1 | 4.096 | — | — |
| COMPDISP-1 | — | 4.096 | — |
| COMPDISP-2 | — | — | 4.096 |
| Diamond D75M | 2.309 | 2.309 | 2.309 |
| 1:1 mixture Dowanol DPM/Glycol | 4.0 | 4.0 | 4.0 |

Evaluation of the Physical Properties of the Coated Aqueous Inventive and Comparative Inks.

The aqueous inks were coated on Sub-1 using an Elcometer Bird Film Applicator (from Elcometer instruments) with a wet thickness of 4 μm and dried for 5 minutes at 100° C. in an oven.

The coatings were evaluated towards their water and ethanol resistance by rubbing with a Q-tip 5 and 10 times. The quality of the coating after the rub-test is rated with a number from 1 to 4. (1=good, 2=medium, 3=poor, 4=very poor). The results are summarized in Table 6.

TABLE 6

| | INVINK-1 | COMPINK-1 | COMPINK-2 |
|---|---|---|---|
| 5× water | 1 | 3 | 4 |
| 10× water | 2 | 3 | 4 |
| 5× Ethanol | 1 | 2 | 1 |
| 10× Ethanol | 1 | 2 | 1 |

From Table 6 it is clear that the aqueous ink comprising the resin particle dispersion according to the invention shows an improved adhesion on a non-absorbing substrate such as polypropylene.

The invention claimed is:

1. An aqueous inkjet ink comprising a pigment and the an aqueous resin particle dispersion, wherein the resin of the aqueous resin particle dispersion comprises a repeating unit according to Formula I:

Formula I

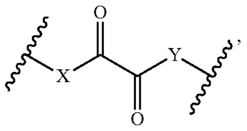

wherein each X independently is O, S, ONH, NH, or NH—NH, and each Y independently is O, S, NH, or NH—NH.

2. The aqueous inkjet ink of claim 1, wherein the resin of the aqueous resin particle dispersion comprises a repeating unit according to Formula II or Formula III:

Formula II

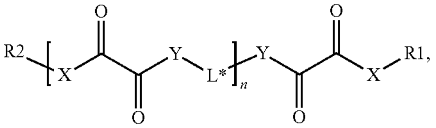

wherein

X and Y are each independently O, S, NH, or NH—NH;

L* represents a divalent, trivalent, tetravalent, heptavalent, or hexavalent linking group;

R1 and R2 each independently represent any substituted or unsubstituted alkyl, aryl, aralkyl or heteroaryl group, or a terminal group; and n is an integer from 0 to 150, or Formula III

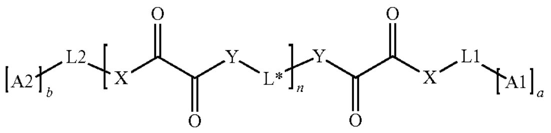

wherein

X and Y are each independently O, S, NH, or NH—NH;

L* represents a divalent, trivalent, tetravalent, heptavalent, or hexavalent linking group;

L1 and L2 are independently a monovalent, divalent, or multi-valent linking group;

A1 and A2 each independently represent any substituted or unsubstituted alkyl, aryl, aralkyl or heteroaryl group, or a terminal group;

a represents 1, 2, 3, 4, or 5, respectively, for a mono-, di-, tri-, tetra-, or heptavalent linking group L1;

b represents 1, 2, 3, 4, or 5, respectively, for a mono-, di-, tri-, tetra-, or heptavalent linking group L2; and n is an integer from 0 to 150.

3. The aqueous inkjet ink of claim 1, wherein the resin of the aqueous resin particle dispersion is encapsulated by a polymeric shell.

4. The aqueous inkjet ink of claim 2, wherein the resin of the aqueous resin particle dispersion is encapsulated by a polymeric shell.

5. The aqueous inkjet ink of claim 3, wherein the polymeric shell is selected from the group consisting of polyureas, polyurethanes, polyurea-urethanes, polyesters, polycarbonates, polyamides, melamine-based polymers, and mixtures thereof.

6. The aqueous inkjet ink of claim 4, wherein the polymeric shell is selected from the group consisting of polyureas, polyurethanes, polyurea-urethanes, polyesters, polycarbonates, polyamides, melamine-based polymers, and mixtures thereof.

7. The aqueous inkjet ink of claim 3, wherein a dispersing group is covalently bonded to the polymeric shell.

8. The aqueous inkjet ink of claim 4, wherein a dispersing group is covalently bonded to the polymeric shell.

9. The aqueous inkjet ink of claim 6, wherein a dispersing group is covalently bonded to the polymeric shell.

10. The aqueous inkjet ink of claim 7, wherein the dispersing group is selected from the group consisting of a carboxylic acid or salt thereof, a sulfonic acid or salt thereof, a phosphoric acid ester or a salt thereof, and a phosphonic acid or salt thereof.

11. The aqueous inkjet ink of claim 8, wherein the dispersing group is selected from the group consisting of a carboxylic acid or salt thereof, a sulfonic acid or salt thereof, a phosphoric acid ester or a salt thereof, and a phosphonic acid or salt thereof.

12. The aqueous inkjet ink of claim 7, wherein the dispersing group is selected from the group consisting of a protonated amine, a protonated nitrogen containing heteroaromatic group, a quaternized tertiary amine, a N-quaternized heteroaromatic group, a sulfonium, and a phosphonium.

13. An inkjet recording method comprising the steps of:

a) jetting the aqueous inkjet ink as defined in claim 1 on a substrate; and b) drying the jetted inkjet ink by applying heat to obtain a temperature of the jetted ink of at least 80° C.

14. The inkjet recording method of claim 13, wherein prior to step a), an aqueous pre-treatment liquid comprising a flocculating agent selected from the group consisting of a multivalent salt and a cationic polymer is applied on the substrate.

15. An inkjet recording method comprising the steps of:

a) jetting the aqueous inkjet ink as defined in claim 2 on a substrate; and b) drying the jetted inkjet ink by applying heat to obtain a temperature of the jetted ink of at least 80° C.

16. The inkjet recording method of claim 15, wherein prior to step a), an aqueous pre-treatment liquid comprising a flocculating agent selected from the group consisting of a multivalent salt and a cationic polymer is applied on the substrate.

17. An inkjet recording method comprising the steps of:

a) jetting the aqueous inkjet ink as defined in claim 3 on a substrate; and b) drying the jetted inkjet ink by applying heat to obtain a temperature of the jetted ink of at least 80° C.

18. The inkjet recording method of claim 17, wherein prior to step a), an aqueous pre-treatment liquid comprising a flocculating agent selected from the group consisting of a multivalent salt and a cationic polymer is applied on the substrate.

19. An inkjet recording method comprising the steps of:

a) jetting the aqueous inkjet ink as defined in claim 7 on a substrate; and b) drying the jetted inkjet ink by applying heat to obtain a temperature of the jetted ink of at least 80° C.

20. The inkjet recording method of claim 19, wherein prior to step a), an aqueous pre-treatment liquid comprising a flocculating agent selected from the group consisting of a multivalent salt and a cationic polymer is applied on the substrate.

* * * * *